United States Patent
Convertini (10) Patent No.: US 12,448,893 B1
(45) Date of Patent: Oct. 21, 2025

(54) ELECTROMAGNETIC INDUCER FOR GAS TURBINE ROTATING TURBOMACHINERY

(71) Applicant: Pratt & Whitney Canada Corp., Longueuil (CA)

(72) Inventor: Marco Convertini, Vaughan (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/787,100

(22) Filed: Jul. 29, 2024

(51) Int. Cl.
*H02K 7/18* (2006.01)
*F01D 5/14* (2006.01)
*F01D 15/10* (2006.01)
*F01D 25/24* (2006.01)

(52) U.S. Cl.
CPC ............ *F01D 5/147* (2013.01); *F01D 15/10* (2013.01); *F01D 25/24* (2013.01); *H02K 7/1823* (2013.01); *F05D 2300/507* (2013.01)

(58) Field of Classification Search
CPC ............ H02K 7/1823; F05D 2300/507; F05D 2220/76; F05D 2220/768; F01D 15/10
See application file for complete search history.

(56) References Cited

U.S. PATENT DOCUMENTS

| | | | | |
|---|---|---|---|---|
| 5,702,273 A * | 12/1997 | Cho | ............ | B63G 8/08 |
| | | | | 310/87 |
| 7,555,893 B2 * | 7/2009 | Okai | ............ | B64D 27/24 |
| | | | | 60/228 |
| 7,603,864 B2 * | 10/2009 | Gemin | ............ | F01D 15/10 |
| | | | | 290/1 A |
| 7,661,271 B1 * | 2/2010 | Millsaps, Jr. | ............ | F02C 7/26 |
| | | | | 60/788 |
| 7,721,555 B2 | 5/2010 | Sharp et al. | | |
| 7,952,244 B2 * | 5/2011 | Colin | ............ | F01D 15/10 |
| | | | | 310/67 R |
| 7,973,421 B2 | 7/2011 | Sharp | | |
| 9,077,221 B2 | 7/2015 | McCormick | | |
| 9,431,877 B2 | 8/2016 | Zehnle | | |
| 9,714,609 B2 | 7/2017 | French et al. | | |
| 10,378,452 B1 * | 8/2019 | Barmichev | ............ | F02K 3/06 |
| 11,022,004 B2 * | 6/2021 | Duce | ............ | F01D 25/24 |
| 11,255,216 B2 | 2/2022 | Chong | | |
| 11,719,119 B1 * | 8/2023 | Schenk | ............ | F01D 15/10 |
| | | | | 416/223 R |
| 11,788,428 B2 | 10/2023 | Simonetti et al. | | |

* cited by examiner

*Primary Examiner* — Justin D Seabe
(74) *Attorney, Agent, or Firm* — CANTOR COLBURN LLP (57) ABSTRACT

Gas turbine engines include fan, compressor, combustor, and turbine sections. An electric machine assembly includes a rotating component comprising a plurality of airfoils and a plurality of first electric machine elements, with each airfoil including a respective first magnetic material electric machine element. A housing is arranged radially outward from the airfoils and includes a circumferential slot. A second electric machine element is arranged within the circumferential slot in the form of a circumferential winding arranged radially outward from the rotating component. A control system is electrically connected to the second electric machine element. Rotation of the rotating component causes the first electric machine elements to generate a magnetic flux and induce a current within the second electric machine element and the control system is configured to distribute the induced current to at least one of a storage device or electrical components of the gas turbine engine.

19 Claims, 8 Drawing Sheets

ELECTROMAGNETIC INDUCER FOR GAS TURBINE ROTATING TURBOMACHINERY

BACKGROUND

The subject matter disclosed herein generally relates to gas turbine engines and gas turbine rotating turbomachinery and, more particularly, to electromagnetic inducers for gas turbine rotating turbomachinery and methods of operation thereof.

Gas turbine engines, such as aircraft engines, may be configured to generate electrical energy for various purposes within and external to the engine. For example, such electrical power generation may be used to provide power for control systems or to provide electrical power to an airframe or other aircraft electrical systems. In current engine configurations, an electrical generator may be configured to supply electrical power required by the gas turbine engine that is driven by a mechanical gearbox. The electrical generator and the mechanical gearbox may be mounted within a nacelle of the engine. As power requirements increase onboard aircraft, the size of the electrical generator has increased to meet the increasing power demands. For gas turbine engines used onboard aircraft (e.g., wing- or fuselage-mounted), the increased size of the electrical generator may require enlarging the nacelle, resulting in increased weight onboard the aircraft and increased aircraft drag. Accordingly, it may be advantageous to provide systems and methods of operation to generate electrical power onboard aircraft without significantly impacting weight, drag, or engine efficiency.

BRIEF DESCRIPTION

According to some embodiments, gas turbine engines are provided. The gas turbine engines include a fan section, a compressor section, a combustor section, and a turbine section. An electric machine assembly includes a rotating component comprising a plurality of airfoils, with a plurality of first electric machine elements, wherein each airfoil of the plurality of airfoils comprises a respective first electric machine element, wherein each first electric machine element comprises a magnetic material. A housing is arranged radially outward from the plurality of airfoils, the housing comprising a circumferential slot. A second electric machine element is arranged within the circumferential slot, wherein the second electric machine element includes a circumferential winding arranged radially outward from the rotating component. A control system is electrically connected to the second electric machine element. Rotation of the rotating component causes the plurality of first electric machine elements to generate a dynamic magnetic flux to induce a current within the second electric machine element, and the control system is configured to distribute the current induced within the second electric machine element to at least one of a storage device or electrical components of the gas turbine engine.

In addition to one or more of the features described herein, or as an alternative, further embodiments of the gas turbine engines may include that each first electric machine element comprises a magnetic cap arranged at a tip of a respective airfoil.

In addition to one or more of the features described herein, or as an alternative, further embodiments of the gas turbine engines may include that each first electric machine element comprises a magnetic coating applied to a tip of a respective airfoil.

In addition to one or more of the features described herein, or as an alternative, further embodiments of the gas turbine engines may include that each airfoil of the plurality of airfoils comprises a magnetic material that extends from a root to a tip of the respective airfoil, wherein the plurality of first electric machine elements is defined by the magnetic material airfoils.

In addition to one or more of the features described herein, or as an alternative, further embodiments of the gas turbine engines may include a cover arranged between tips of the respective airfoils and the second electric machine element, the cover sealing the second electric machine element within the slot.

In addition to one or more of the features described herein, or as an alternative, further embodiments of the gas turbine engines may include a filler material arranged within the slot to secure the second electric element within the slot.

In addition to one or more of the features described herein, or as an alternative, further embodiments of the gas turbine engines may include that the second electric machine element has a diameter (D) that is sized relative to a chord length (L) of the plurality of airfoils such that: $0.25\ L \leq D \leq 1.50\ L$.

In addition to one or more of the features described herein, or as an alternative, further embodiments of the gas turbine engines may include that the control system is configured to direct a current through the second electric machine element in a reverse direction counter to a direction of rotation of the rotating component.

In addition to one or more of the features described herein, or as an alternative, further embodiments of the gas turbine engines may include at least one sensor arranged to monitor an air gap between blade tips of the plurality of airfoils and the housing, wherein the control system is configured to control a current through the second electric machine element to correct for deviations in the air gap and balance or align the rotating component relative to the housing.

In addition to one or more of the features described herein, or as an alternative, further embodiments of the gas turbine engines may include that the control system is configured to direct a counter current through the second electric machine element to induce a reverse magnetic field and slow a rotation of the rotating component.

In addition to one or more of the features described herein, or as an alternative, further embodiments of the gas turbine engines may include that the control system is configured to maintain an alignment of the rotating component relative to the housing by selectively directing the current through the second electric machine component.

In addition to one or more of the features described herein, or as an alternative, further embodiments of the gas turbine engines may include that the rotating component is part of at least one of the fan section, the compressor section, or the turbine section.

In addition to one or more of the features described herein, or as an alternative, further embodiments of the gas turbine engines may include that the control system is arranged within the slot.

In addition to one or more of the features described herein, or as an alternative, further embodiments of the gas turbine engines may include that the second electric machine element is formed of a coil made from at least one of copper, gold, aluminum, silver.

In addition to one or more of the features described herein, or as an alternative, further embodiments of the gas turbine engines may include that the first electric machine element is formed from neodymium.

In addition to one or more of the features described herein, or as an alternative, further embodiments of the gas turbine engines may include that the fan section, a low pressure compressor of the compressor section, and a low pressure turbine of the turbine section comprise a low-pressure system having a rotational speed of N1 and a high pressure compressor of the compressor section and a high pressure turbine of the turbine section comprise a high-pressure system having a rotational speed of N2, wherein the control system is configured to distribute the current to at least one of the low-pressure system and the high-pressure system to couple the rotational speeds N1, N2.

According to some embodiments, methods of operating gas turbine engines are provided. The gas turbine engines include a fan section, a compressor section, a combustor section, and a turbine section. The method includes rotating a plurality of first electric machine elements on a rotating component, wherein the plurality of first electric machine elements are arranged at tips of respective airfoils of the rotating component, wherein each first electric machine element comprises a magnetic material, inducing a current within a second electric machine element, the second electric machine element arranged within a circumferential slot in a housing that is arranged radially outward from the airfoils of the rotating component; wherein the second electric machine element comprises a circumferential winding arranged radially outward from the rotating component, and distributing the current induced within the second electric machine element using a control system that is electrically connected to the second electric machine element, wherein rotation of the rotating component causes the plurality of first electric machine elements to generate a dynamic magnetic flux to induce the current within the second electric machine element, and wherein the current is distributed to at least one of a storage device or electrical components of the gas turbine engine.

In addition to one or more of the features described herein, or as an alternative, further embodiments of the methods may include reversing a current through the second electric machine element to cause a balancing operation to maintain an air gap between tips of the plurality of airfoils and the housing.

In addition to one or more of the features described herein, or as an alternative, further embodiments of the methods may include reversing a current through the second electric machine element to generate a braking force to slow a rotation of the rotating component.

In addition to one or more of the features described herein, or as an alternative, further embodiments of the methods may include that the fan section, a low pressure compressor of the compressor section, and a low pressure turbine of the turbine section comprise a low-pressure system having a rotational speed of N1 and a high pressure compressor of the compressor section and a high pressure turbine of the turbine section comprise a high-pressure system having a rotational speed of N2, the method further includes distributing the current to at least one of the low-pressure system and the high-pressure system to couple the rotational speeds N1, N2.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
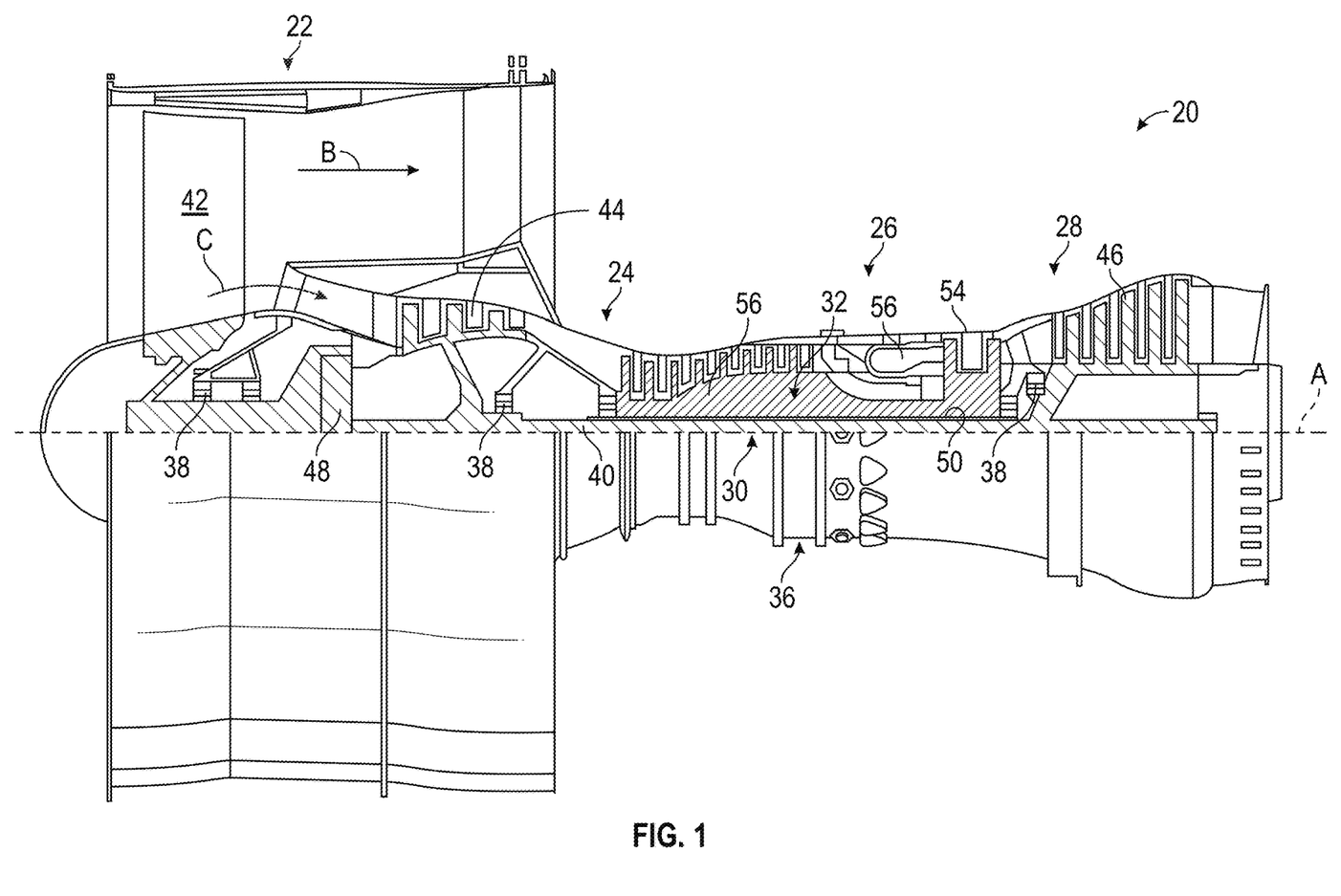
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include other components, systems, or features without departing from the scope of the present disclosure. The fan section 22 drives a first portion of air along a bypass flow path B in a bypass duct, and a second portion of air is directed into the compressor section 24 to drive air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a low pressure compressor 44, and a low pressure turbine 46. The inner shaft 40 is connected to the fan 42 through a speed change mechanism, which in the illustrative gas turbine engine 20 is arranged as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A portion of the engine static structure 36 is arranged generally between the high pressure turbine 54 and the low pressure turbine 46. The engine static structure 36 is configured to support the bearing systems 38 in the turbine section 28. The inner shaft 40 and the outer shaft 50 may be arranged in a concentric arrangement and may be configured to rotate via the bearing systems 38 about the engine central longitudinal axis A which is collinear with their longitudinal axes.

The core airflow directed through the core flow path C is compressed by the low pressure compressor 44 and then the high pressure compressor 52. The compressed air is mixed and burned or combusted with fuel in the combustor 56. The combustion output from the combustor 56 is then expanded over the high pressure turbine 54 and low pressure turbine 46. The high and low pressure turbines 46, 54 rotationally drive the respective low speed spool 30 and high speed spool 32 in response to the expansion. It will be appreciated that each of the positions and/or arrangements of the fan section 22, the compressor section 24, the combustor section 26, the turbine section 28, and the fan drive gear system 48 may be varied. For example, in some alternative configurations, the gear system 48 may be located aft of the combustor section 26 or even aft of the turbine section 28. Further, in some configurations, the fan section 22 may be positioned forward or aft of the location of the gear system 48.

The gas turbine engine 20 in one non-limiting example is a high-bypass geared aircraft engine. In some configurations, the gas turbine engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3. In some configurations, the low pressure turbine 46 may have a pressure ratio that is greater than about five (5). In one example embodiment, the gas turbine engine 20 has a bypass ratio that is greater than about ten (10:1), the fan diameter is significantly larger than that of the low pressure compressor 44, and the low pressure turbine 46 has a pressure ratio that is greater than about five 5:1. The low pressure turbine 46 may have a pressure ratio that is a pressure measured prior to an inlet of the low pressure turbine 46 as related to a pressure at the outlet of the low pressure turbine 46 prior to an exhaust nozzle. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)] 0.5. The "Low corrected fan tip speed" as disclosed herein according to one non-limiting embodiment is less than about 1150 ft/second (350.5 m/sec).

Figure 2:
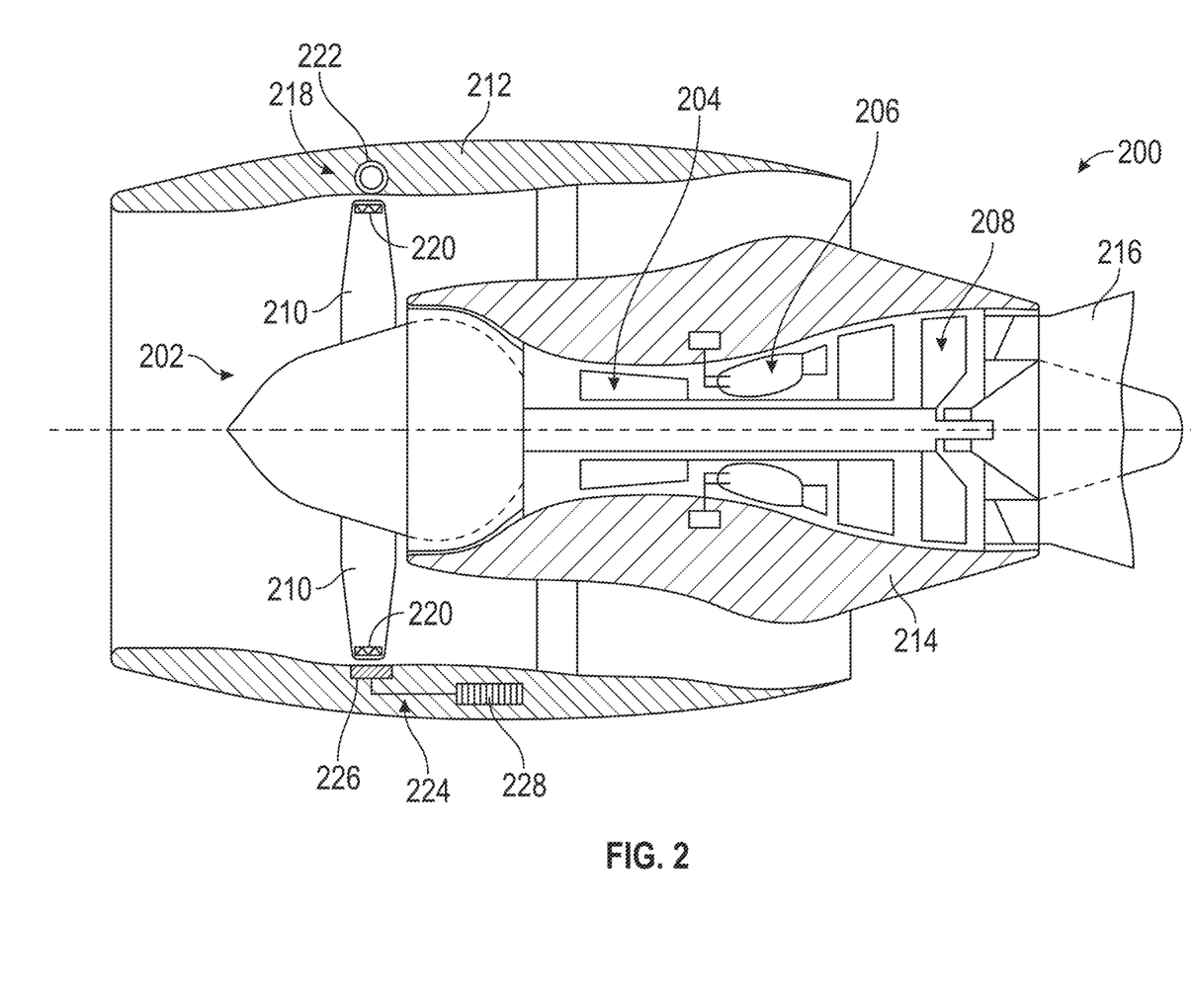
FIG. 2 is a partial cross-sectional view of a gas turbine engine in accordance with an embodiment of the present disclosure.

Referring now to FIG. 2, a schematic illustration of a gas turbine engine 200 in accordance with an embodiment of the present disclosure is shown. The gas turbine engine 200 may be similar to that shown and described above. The gas turbine engine 200 includes a fan section 202, a compressor section 204, a combustor section 206, and a turbine section 208. The fan section 202 includes a plurality of fan blades 210 that are rotated within a fan housing 212. The compressor section 204, the combustor section 206, and the turbine section 208 are arranged within an engine housing 214. A bypass flow is directed by the fan blades 210 through a conduit or flow path defined, at least partially, between the fan case 212 and the engine case 214. A core flow is directed into the engine case 214 and through the compressor section 204 (e.g., high pressure and low pressure compressors), combusted with fuel within the combustor section 206, expanded through the turbine section 208 (e.g., high pressure and low pressure turbines), and expelled through a nozzle 216.

The gas turbine engine 200 may be configured with an integrated electric machine assembly 218 integrated into a rotary component, such as the fan section 202, the compressor section 204, and/or turbine section 208. In this illustrative embodiment, and for the purpose of clarity and ease of explanation and illustration, the fan blades 210 are modified to operate as part of the integrated electric machine assembly 218. In this configuration, the fan blades 210 include first electric machine elements 220. The first electric machine elements 220 may be applied to or integrated within the fan blades 210. Arranged radially outward from the tips of the fan blades 210 and arranged within the fan case 212 is a second electric machine element 222. In this illustrative configuration, the first electric machine elements 220 may be magnets, magnetic material, or the like. In some embodiments, the first electric machine elements 220 may be permanent magnets. The second electric element 222, in this configuration, is a conductive coil that is arranged within the fan case 212.

In accordance with embodiments of the present disclosure, the high mechanical shaft speeds of the gas turbine engine 200 is utilized to convert kinetic energy into electrical energy via magnetic induction. Each fan blade 210 of the fan section 202 is equipped with a respective first electric machine element 222.

Around the circumference of the fan section 202, and arranged within the fan case 212, directly over the tips of fan blades 210, a second electric machine element 222 (e.g., a circular coil with good magnetic permeability properties) is arranged within a slot or channel in the fan case 212. The slot or channel may be machined, fabricated, integrally formed, molded, or otherwise formed in the fan case 212. The second electric machine element 222 is fixed within the slot and positioned closely enough to the path of the rotating blade tips of the fan blades 210 with the first electric machine elements 220 to obtain a change in magnetic flux but at sufficient distance away to avoid physical contact. That is, an air gap is present between the tips of the fan blades 210 and the inner diameter surface of the fan case 212. In some embodiments, the second electric machine element 222 may be arranged behind a cover that defines a portion of the inner diameter surface of the fan case 212.

As the fan of the fan section 202 spins, the blade tips move in their prescribed circular path in proximity to, but not contacting, the inner diameter surface of the fan case 212. As the fan section 202 spins, the movement of the first electric machine elements 220 changes the magnetic flux through the area enclosed by the second electric machine element 222 (e.g., a coil or the like). Leveraging Faraday's Law, the dynamic magnetic flux induces an electromotive force (EMF) in the second electric machine element 222. The current that is generated may be used to power auxiliary electrical systems within the gas turbine engine 200 or other aircraft system(s), stored in re-chargeable batteries, stored in a capacitor with the intent of releasing the current when required, or may be otherwise utilized onboard an aircraft or onboard the gas turbine engine 200.

The second electric machine element 222 is electrically connected to a control system 224. The control system 224, in this embodiment, includes a storage element 226 and a control element 228. The control system 224 may be configured to control electrical power input and/or output, into and/or from the second electric machine element 222. For example, in this illustrative configuration, with the first electric machine elements 220 being magnets and the second electric machine element 222 being a conductive coil, the rotation of the fan blades 210 will generate a dynamic magnetic flux that induces an electrical current within the second electric machine element 222. The control system 224 may be configured to store the electrical energy in the storage element 226. The electrical energy stored in the storage element 226 may be distributed therefrom by control and/or instructions received from the control element 228. In some embodiments, the control system 224 may be configured as a single electronic assembly, or may be separated into discretely located components, such as shown in FIG. 2. In some embodiments, the control system 224 or a part thereof (e.g., control element 228) may be part of an aircraft electronic engine control system.

Although shown in FIG. 2 with the first electric machine elements 220 arranged on the fan blades 210 of the fan section 202, and the second electric machine elements 222 arranged outward therefrom, it will be appreciated that other configurations are possible without departing from the scope of the present disclosure. For example, in some embodiments, airfoils or blades of the compressor section 204 and/or airfoils or blades of the turbine section 208 may be similarly configured with respective first electric machine elements and associated second electric machine elements may be arranged radially outward therefrom. Further, although described above with the first electric machine elements 220 being magnetic elements (e.g., permanent magnets) that are rotated to generate a dynamic magnetic flux which induces a current within the second electric machine element 222, such configuration is not intended to be limiting. For example, in some embodiments, and as described herein, the first electric machine elements arranged on the blades of a rotating component may be electrically powered or supplied with an electrical current which is suppled through in an interior structure of the blades. In some such configurations, the second electric machine elements (arranged in the slot/channel of the case/housing) may be magnetic elements.

Figure 3A:
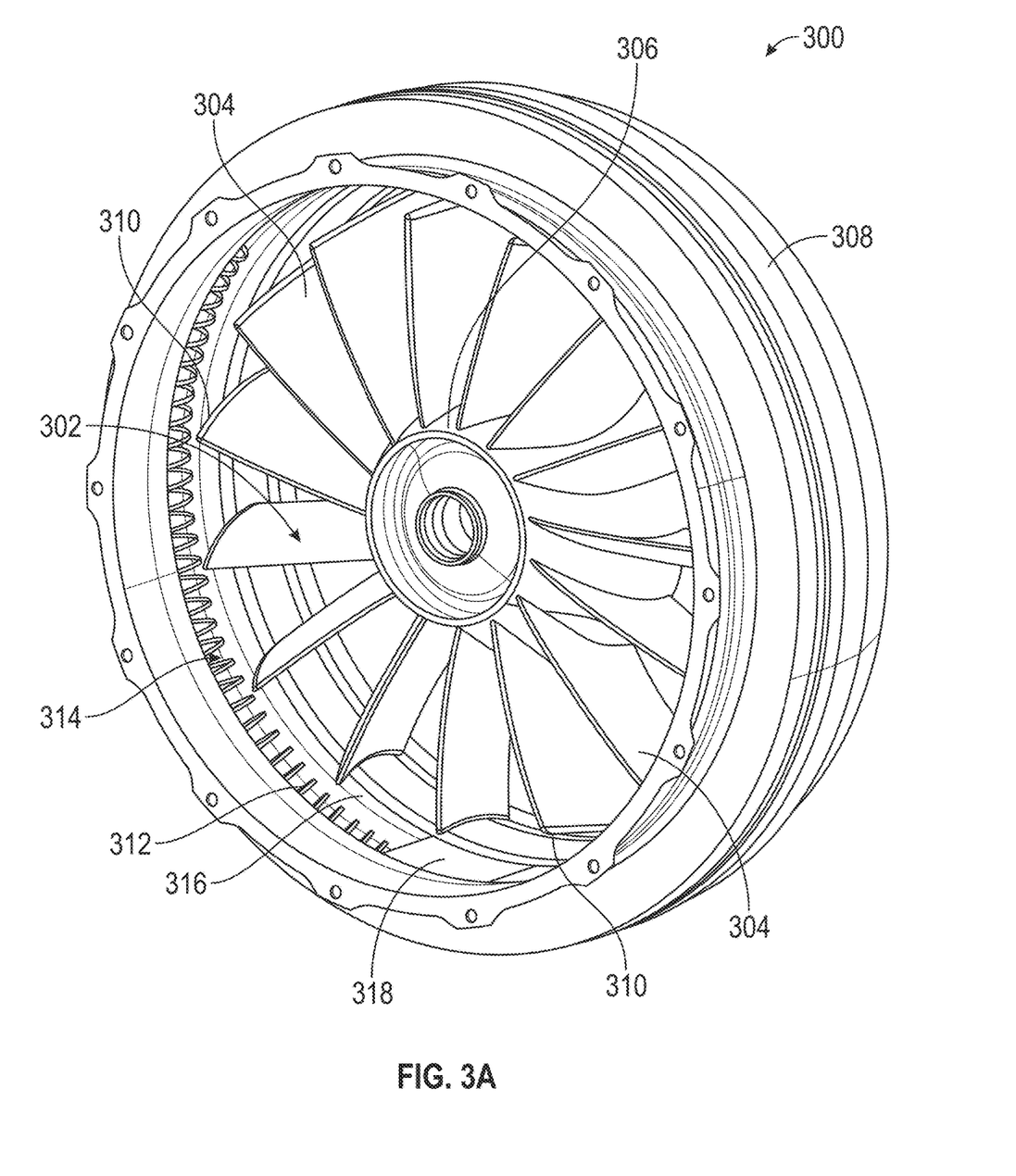
FIG. 3A is a schematic illustration of an electric machine assembly for a gas turbine engine, in accordance with an embodiment of the present disclosure.
Figure 3B:
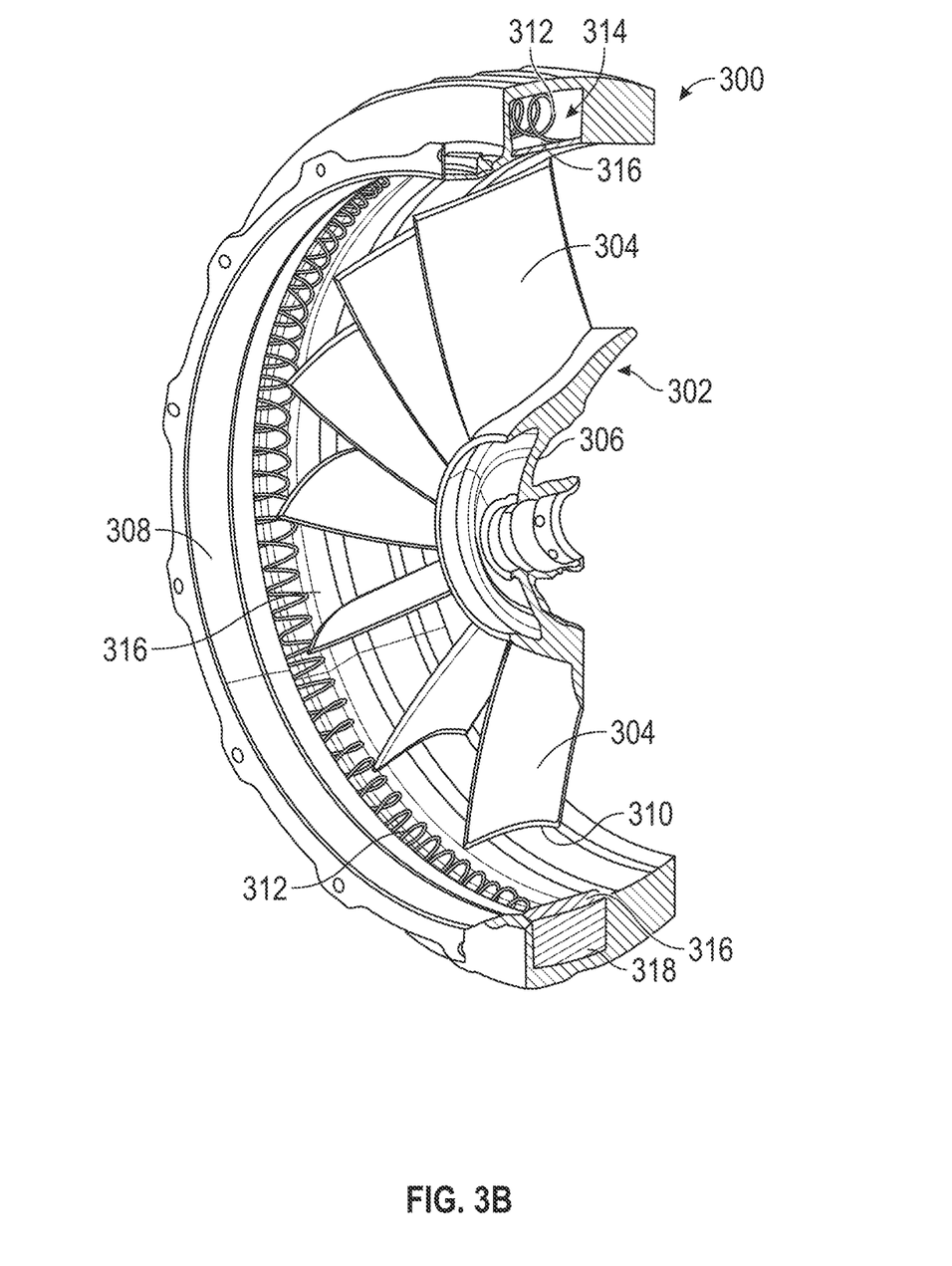
FIG. 3B is a partial cut-away view of the electric machine assembly of FIG. 3A.
Figure 3C:
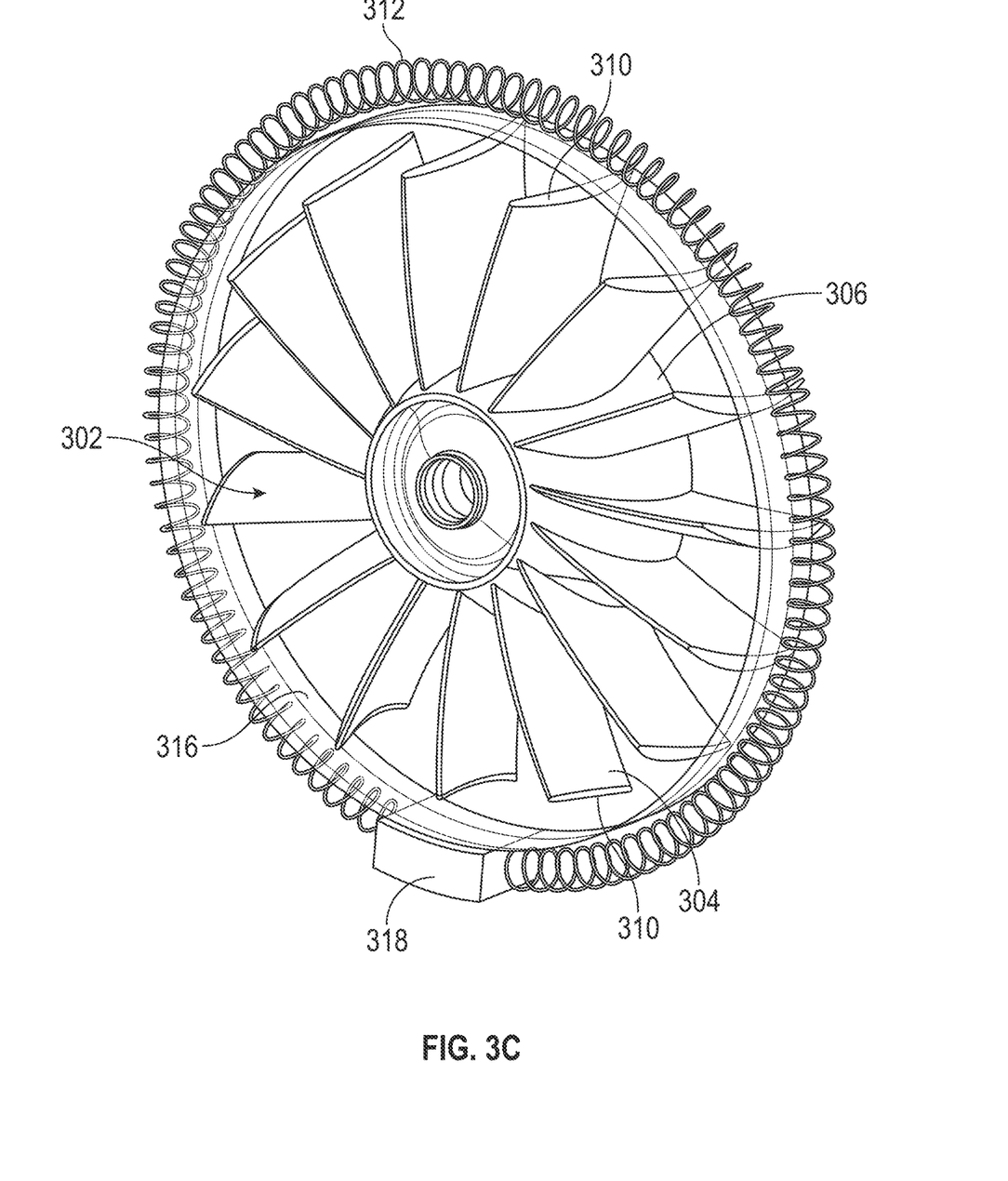
FIG. 3C illustrates portions of the electric machine assembly of FIG. 3A.

Referring now to FIGS. 3A-3C, schematic illustrations of an electric machine assembly 300 in accordance with an embodiment of the present disclosure are shown. FIG. 3A illustrates a perspective view of the electric machine assembly 300, FIG. 3B is a partial cross-sectional illustration of the electric machine assembly 300, and FIG. 3C illustrates a portion of the electric machine assembly 300. The electric machine assembly 300 may be arranged as part of a gas turbine engine, such as a rotating component of a fan section, a compressor section, or a turbine section, as shown and described above. The electric machine assembly 300 includes a rotating component 302, such as a rotor disk, having a number of airfoils 304 extending radially outward from a hub 306. The hub 306 may be operably connected to a shaft of a gas turbine engine, and may be rotationally driven by the shaft, as will be appreciated by those of skill in the art.

The rotating component 302 is configured to rotate relative to a fixed or static structure, such as a case or housing 308. The housing 308 may be part of a fan case or fan housing in configurations where the rotating component 302 is a fan of a gas turbine engine. In embodiments where the rotating component 302 is a part of a compressor or turbine section of a gas turbine engine, the housing 308 may be part of an engine housing, as will be appreciated by those of skill in the art. The rotating component 302, in this configuration, is arranged to generate dynamic magnetic flux by rotating first electric machine elements 310 that are arranged at tips of the airfoils 304.

A second electric machine element 312 is arranged within a slot 314 that is defined within the structure of the housing 308. The slot 314 is a full-hoop slot to receive a full-hoop second electric machine element 312, such as a conductive coil or winding. The second electric machine element 312 is secured within the slot 314 by a cover 316. The cover 316 may be made from the same or similar material as the housing 308. In some embodiments, the cover 316 may be made from sheet metal that is affixed to the housing 308 over the slot 314 after the second electric machine element 312 is arranged within the slot 314. The cover 316 may be provided to prevent material from entering the slot 314, to secure the second electric machine element 312 within the slot 314, and/or to prevent contact between the airfoils 304 and the second electric machine element 312.

The electric machine assembly 300 includes a control system 318, which may include electrical storage (e.g., battery, capacitor, etc.) and/or electronic control elements, such as processors, memory, input/output devices, electrical control and distribution functionality, or the like. In this configuration, the control system 318 is arranged within the slot 314. In other embodiments, the control system 318 may be arranged separate from the slot 314, such as with other electronic components of an aircraft or gas turbine engine.

In accordance with embodiments of the present disclosure, the electrical energy generated by the electric machine assembly 300 may be stored in the control 318 (or a component thereof) and may be used to improve response times, alignment of the speeds of the high power or high speed shaft and the low power or low speed shaft, and the like. The operation and power distribution may be made to adjust the rotational speeds of different shafts or sections of a gas turbine engine. As used herein, N1 refers to rotation speed of the low-pressure system of the gas turbine engine (e.g., fan, low pressure compressor, low pressure turbine) and N2 refers to the rotation speed of the high-pressure system of the gas turbine engine (e.g., high pressure compressor, high pressure turbine). The generated or stored electrical power may be distributed or otherwise controlled by the control system 318, which may be part of an aircraft electronic engine control (EEC). The control system 318 may be configured to monitor the coupling of N1 and N2, such as by using various sensors and/or feedback elements as will be appreciated by those of skill in the art. When an incident occurs that decouples N2 and N1 beyond installation manual limits (e.g., Surge, flameout etc.) the control system 318 may distribute or otherwise use the electrical energy to transiently increase or decrease the speed of either shaft. That is, the electrical energy generated by the electric machine assembly 300, which is integrated into the engine components (e.g., fan, compressors, and/or turbine) may be used to supplement the rotational speed of one or more of the engine shafts, e.g., using an electric machine that is operably coupled to the respective shafts.

Additionally, the reverse process of generating a magnetic field from electric current passing through the second electric machine element 312 may be used to produce an opposing magnetic field. This opposing magnetic field generated by the second electric machine element 312 may cause a counter force to a rotational direction of the rotating component 302. The induced, opposing magnetic field will resist the rotating turbomachinery from unbalancing itself and contacting the housing 308 and/or the cover 316. Such active alignment and balancing of the rotating component 302 relative to the housing 308 can eliminate the requirement for an abradable material that protects the rotating turbomachinery (e.g., airfoils 304) against rub due to contact with material of the housing 308.

In accordance with some embodiments of the present disclosure, the second electric machine element 312 may be a conductive coil or winding. Such coils or windings may be formed from copper, although alternative materials are possible without departing from the scope of the present disclosure (e.g., gold, aluminum, silver, etc.). The diameter of the coil/winding may be dependent on design requirements, but falls within a ratio of airfoil chord length: $0.25<D<1.50$, wherein D is the airfoil chord length (from a leading edge to a trailing edge of the airfoil). The number of turns of the second electric machine element 312 corresponds to a desired current output, with a greater number of turns having a higher current capacity than a similar configuration with fewer turns.

In accordance with some embodiments, the cover 316 may be a sheet metal cover or may be formed from non-magnetic materials. In accordance with some embodiments, the cover is formed from or made of laminated metal and/or a low permeability material to mitigate magnetic flux shunting while maintaining aerodynamic efficiency. The cover 316 encases or encloses the second electric machine element 312 within the slot 314. In some embodiments, the volume of the slot 314 that is not occupied by the second electric machine element 312 may be filled with a non-magnetic filler material. The filler material may be a gel or foam material selected for low (or no) magnetic response and light weight. In some embodiments, the filler material may be used to secure the second electric machine element 312 within the slot 314. In some embodiments, the second electric machine element 312 may be secured within the slot 314 by fasteners or the like.

In accordance with some embodiments, the control system 318, as noted, may include electrical storage capability. As such, in some embodiments, the control system 318 may include or function as an electrical energy storage bank. In some embodiments, a rechargeable battery or a capacitor may be used to store the electrical energy. In some configurations, paths for the electricity to be distributed to other locations on the engine and/or aircraft may be provided and used to distribute electrical power as directed by the control system 318 (e.g., aircraft EEC). As noted above, the control system 318 may be arranged within the slot 314, or may be arranged separate therefrom. When the control system 318 is arranged remotely, electrical wiring may electrically connect the second electric machine component 312 with the control system 318.

Figure 4A:
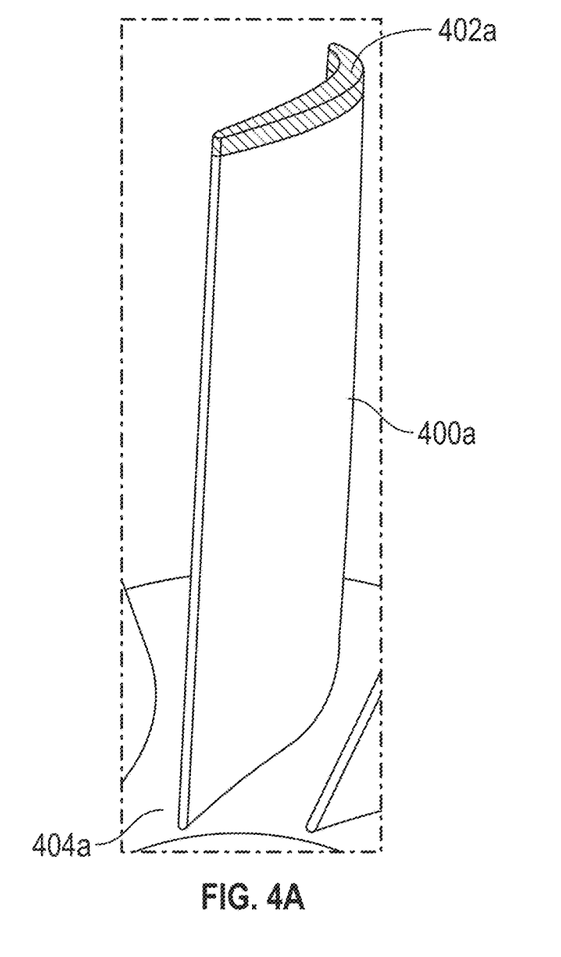
FIG. 4A is a schematic illustration of an airfoil in accordance with an embodiment of the present disclosure illustrating a first configuration.
Figure 4B:
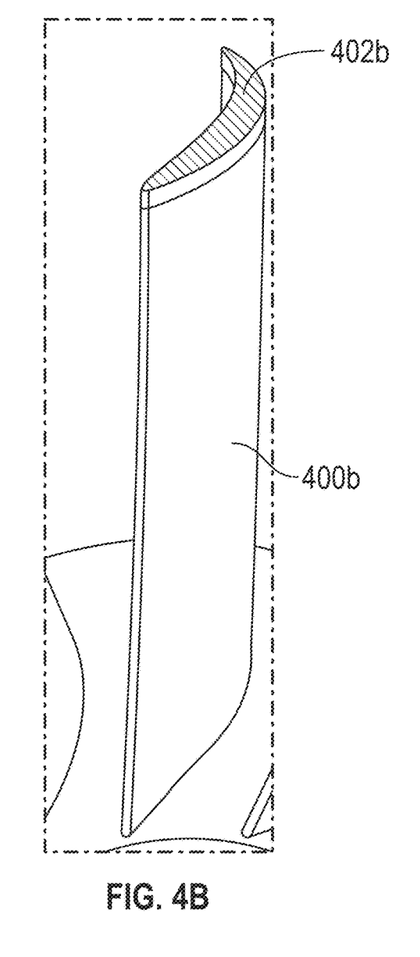
FIG. 4B is a schematic illustration of an airfoil in accordance with an embodiment of the present disclosure illustrating a second configuration.
Figure 4C:
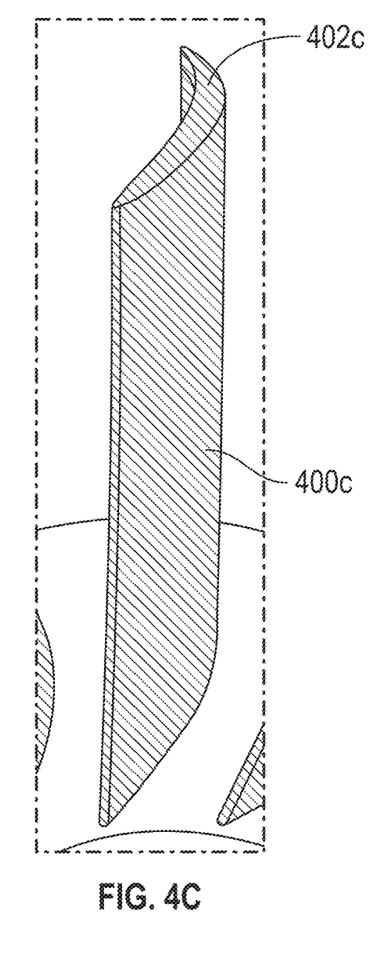
FIG. 4C is a schematic illustration of an airfoil in accordance with an embodiment of the present disclosure illustrating a third configuration.

Referring now to FIGS. 4A-4C, schematic illustrations of example airfoils 400a, 400b, 400c in accordance with embodiments of the present disclosure are shown. The airfoils 400a, 400b, 400c may be arranged as part of rotary or rotating components of gas turbine engines, such as airfoils/blades for a fan section, a compressor section, and/or a turbine section, as described above. The airfoils 400a-c are provided with respective first electric machine elements 402a-c, to thus have the first electric machine elements 402a-c form a part of an electric machine assembly, as shown and described above.

FIG. 4A illustrates a first configuration of an airfoil 400a having a first electric machine element 402a arranged at a tip of the airfoil 400a. The airfoil 400a extends radially outward from a hub 404a that is rotationally driven by a shaft or the like. In the configuration of FIG. 4A, the first electric machine element 402a is a cap that is attached or formed at the radially outward tip of the airfoil 400a. The first electric machine element 402a may be attached by known mechanisms, including, but not limited to, welding, machining, molds, use of fasteners, internal engagement features (e.g., slot and key locking mechanisms), or the like. In some embodiments, the tip of the airfoil 400a may be doped with a magnetic material at the tip region to form a magnetic blade cap that is integral with the airfoil 400a. In some embodiments, the tips of the airfoil 400a, that is the first electric machine element 402a, may be made of neodymium or other rare earth metals. The geometry of the first electric machine element 402a may follow the geometry of the blade tip of the airfoil 400a. That is, the first electric machine element 402a may have a geometry substantially similar to that of the geometry of the tip of the airfoil 400a, and thus the aerodynamics of the airfoil 400a are not impacted by the inclusion thereof.

FIG. 4B illustrates an alternative configuration of an airfoil 400b that may be used in electric machine assemblies, as described herein. The airfoil 400b includes a first electric machine element 402b in the form of a coating that is applied to the tip of the airfoil 400b. That is, rather than being formed as a part or structural portion of the airfoil, in the configuration of FIG. 4B, the first electric machine element 402b is defined by an application of a magnetic material coating applied to the tip of the airfoil 400b.

FIG. 4C illustrates another example configuration of an airfoil 400c in accordance with an embodiment of the present disclosure. In this configuration, the airfoil 400c is formed completely of a magnetic material, such that the first electric machine element 402c is defined by the entirety of the airfoil 400c (e.g., from root to tip).

The configurations illustrated in FIGS. 4A-4C are merely illustrative examples, and other configurations may be employed without departing from the scope of the present disclosure. For example, any portion of an airfoil may be formed of and/or include a magnetic component that when rotated will induce a dynamic magnetic flux.

Figure 5:
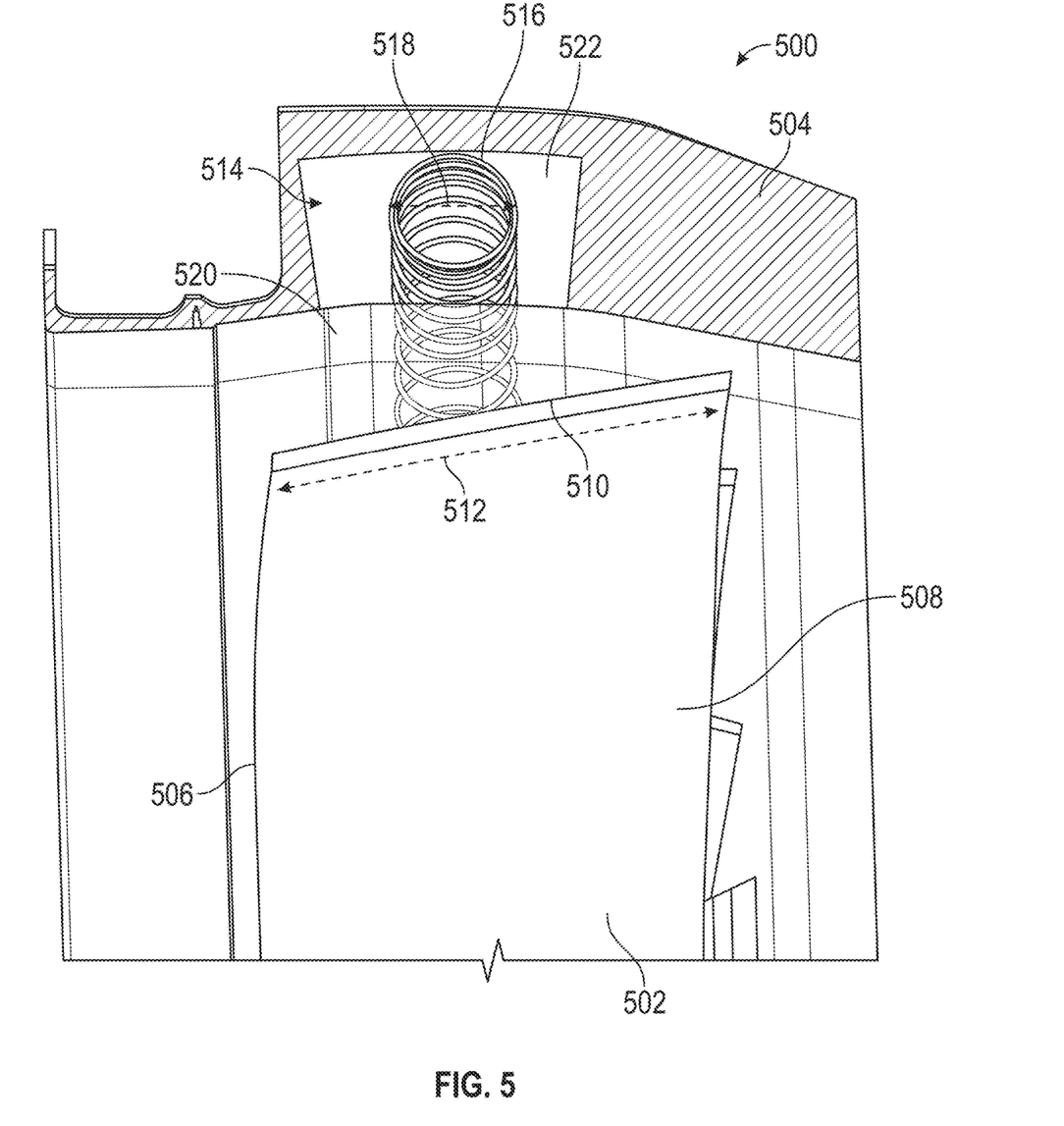
FIG. 5 is a schematic illustration of a portion of an electric machine assembly in accordance with an embodiment of the present disclosure.

Referring now to FIG. 5, a schematic illustration of a portion of an electric machine assembly 500 in accordance with an embodiment of the present disclosure. FIG. 5 illustrates a partial cut-away view of the portion of the electric machine assembly 500. The electric machine assembly 500 includes a rotating component having a plurality of airfoils 502 that are configured to be rotated relative to a static or stationary structure, such as a housing 504. The airfoil 502 has a leading edge 506 and a trailing edge 508, with a first electric machine element 510 arranged at a blade tip of the airfoil 502. The airfoil 502 defines a chord length 512 that extends from the leading edge 506 to the trailing edge 508 along the tip of the airfoil 502, as will be appreciated by those of skill in the art.

Similar to the configurations described above, the electric machine assembly 500 includes a slot 514 in the housing 504. A second electric machine element 516 is arranged within the slot 514. The second electric machine element 516 is a coil or winding having a coil diameter 518. The second electric machine element 516 is positioned and retained within the slot 514 by means of a cover 520 and optional filler material 522, such as an aerogel, matrix material, foam, or the like. In accordance with some embodiments of the present disclosure, the coil diameter 518 is selected to have a dimension related to the chord length 512. For example, and without limitation, in some embodiments, the coil diameter 518 (D) may have a dimension that is 0.25 to 1.5 times the chord length 512 (L): $0.25\ L \leq D \leq 1.50\ L$. It will be appreciated that the slot 514 has a dimension that is sized to accommodate the second electric machine element 516.

Figure 6:
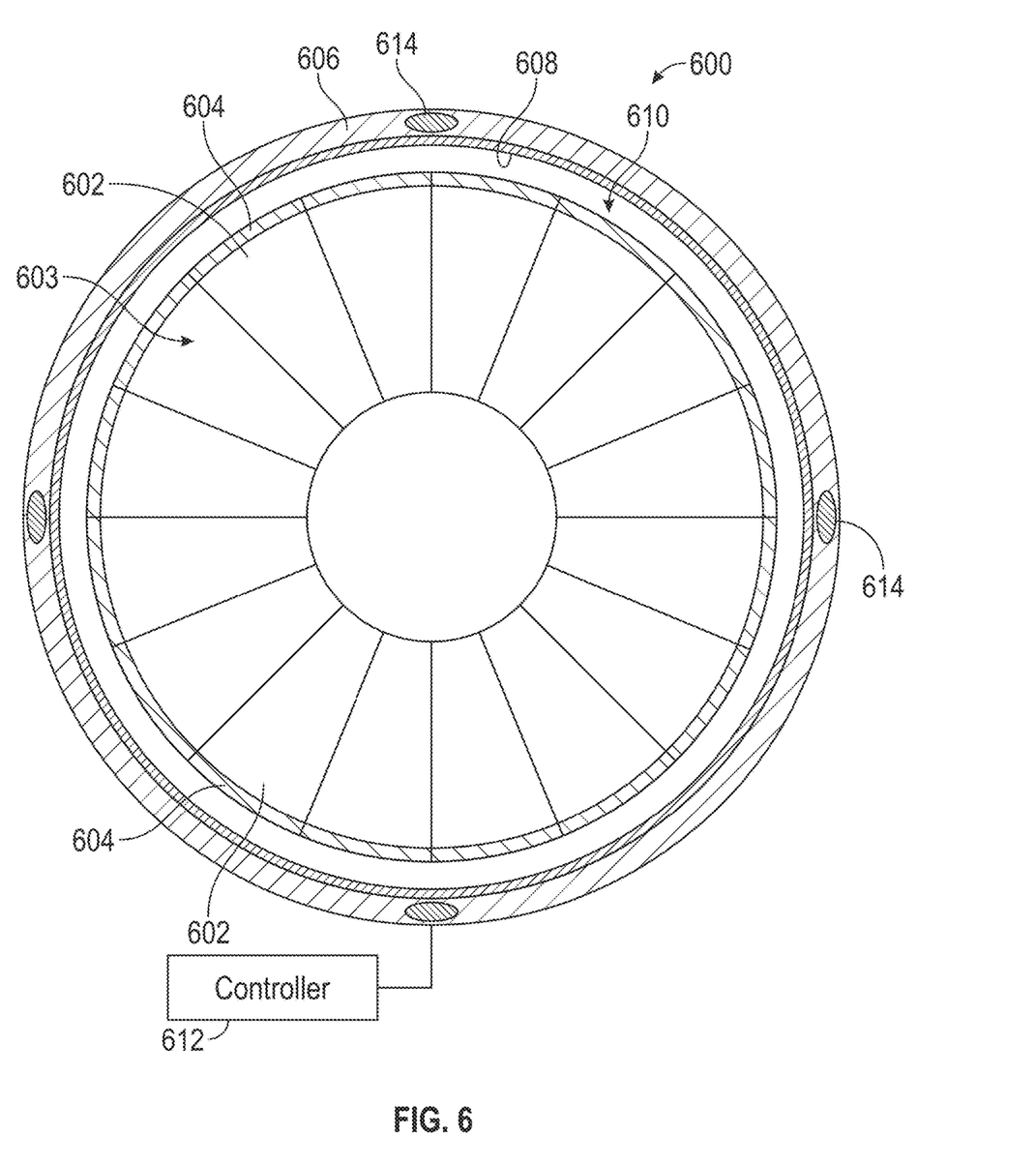
FIG. 6 is a schematic illustration of an electric machine assembly in accordance with an embodiment of the present disclosure.

Referring now to FIG. 6, a schematic illustration of an electric machine assembly 600 in accordance with an embodiment of the present disclosure. The electric machine assembly 600 includes a plurality of airfoils 602 arranged on or as part of a rotating component 603. The airfoils 602 each include a first electric machine element 604 arranged at a blade tip of the respective airfoil 602. The electric machine assembly 600 includes a second electric machine element 606 arranged circumferentially about the rotating component 603 and the airfoils 602 thereof. The second electric machine element 606 may be arranged within a slot of a housing, as shown and described above. The second electric machine element 606 may be retained in place, in part, by a cover 608, which is arranged radially between the first electric machine elements 604 on the tips of the airfoils 602 and the second electric machine element 606.

An air gap 610 is defined between the first electric machine elements 604 on the tips of the airfoils 602 and the cover 608. The air gap 610 is provided, in part, to ensure that the tips of the airfoils 602 do not contact the housing and/or the cover 608, such as due to deviations from a centerline axis of an engine. During operation, however, the air gap 610 may change, such as due to imbalance, vibrations, or the like. Conventionally, these shifts in the relative position of the housing and the airfoils is managed by allowing some amount of contact between the tips of the airfoils and an inner surface of a housing/casing. To accommodate these contacts, the inner diameter of the housing may be provided with an abradable material that protects the rotating airfoils against rub and wear.

In accordance with some embodiments of the present disclosure, such abradable material may be eliminated or omitted due to operational control of the electric machine assembly 600, which can be operated to maintain the position of the rotating component 603 relative to the cover 608 and housing in which the second electric machine element 606 is retained. The electric machine assembly 600 includes a control system 612, which can include electrical power storage components (e.g., batteries, capacitors, etc.) and/or control logic (e.g., processors, memory, etc.). The control system 612 may be operably connected to or otherwise in communication with one or more sensors 614 which are distributed about the circumference of the housing and arranged radially outward from the air gap 610. The sensors 614 may be arranged and configured to monitor the size of the air gap 610, and thus can monitor offsets and/or imbalance of the rotating component 603. The sensors 614 may be optical sensors, proximity sensors, magnetic sensors, or the like. In some embodiments, the sensors 614 may be arranged on the cover 608. In some embodiments, the sensors 614 may be arranged on the housing and/or within the slot that contains the second electric machine element 606.

In operation, as the rotating component 603 is rotated, the first electric machine elements 604 will induce a dynamic magnetic flux, which will induce a current within the second electric machine element 606. The control system 612 may receive the induced current and store the electric power in a power storage device (e.g., battery and/or capacitor) and/or may directly distribute the electric power to other systems of an aircraft engine or the aircraft itself. During such an operation (e.g., power generation), the control system 612 may also be configured to monitor data and information regarding the air gap 610 as received from the sensors 614. If a deviation in position of the rotating component 603 is detected, the control system 612 may be configured to reverse from a power extraction operation (i.e., receiving induced current) to a power input operation, where current is directed into the second electric machine element 606. In such an operation, the power input operation will cause current to pass through the second electric machine element 606 in a reverse direction, which will generate a magnetic field that is opposing to the dynamic magnetic flux generated by the rotating first electric machine elements 604. By generating a controlled, opposing magnetic field, the control system 612 may cause a rebalancing and recentering of the rotating component 603, to thereby maintain the air gap 610 at acceptable levels, and thereby prevent contact between the tips of the airfoils 602 and/or the first electric machine elements 604 with the cover 608 and/or housing.

Furthermore, in some configurations, the control system 612 may be configured to induce a counter magnetic field by directing current through the second electric machine element 606. Such operation can be used to balance or center the rotating component 603 relative to a housing. Further, such operation may be used as a slowing or braking force to slow the rotation of the rotating component 603. Similarly, by inducing a current in the same direction as rotation of the rotating component 603, additional force may be applied to the rotating component 603, which can be used to adjust the relative rotational speeds of the different shafts of an engine in which the electric machine assembly 600 is incorporated.

Advantageously, embodiments of the present disclosure are directed to the incorporation and integration of an electric machine assembly into a rotating section of a gas turbine engine, such as a fan section, a compressor section, and/or a turbine section. The integrated electric machine assembly includes a first electric machine element arranged on or as part of a rotating component and a second electric machine element that is arranged radially outward from the first electric machine element. The second electric machine element is fixed, static, or stationary, and may be arranged within a slot or channel within a housing that surrounds the rotating component. As the rotating component rotates, the first electric machine elements are rotating and generate a dynamic magnetic flux that induces an electromotive force (EMF) in the second electric machine element. The induced force will generate a current within the second electric machine element, and the electrical current may be distributed for use on board the engine and/or aircraft and/or may be stored in a storage device. Accordingly, some embodiments of the present disclosure are directed to generating electrical power by employing a rotating component of a gas turbine engine.

Advantageously, in some embodiments, the electrical energy may be stored and later used to improve the N1 and N2 response times, better aligning the high power and low power shaft speeds of the gas turbine engine. This may be achieved a control system (e.g., aircraft electronic engine control (EEC)), which is configured to monitor the coupling of N1 and N2. When an incident occurs that decouples N2 and N1 beyond predefined limits (e.g., due to surge, flameout etc.) the control system may use the electrical energy to transiently increase or decrease the speed of either shaft.

Additionally, advantageously and in accordance with some embodiments, a reverse process of generating a magnetic field from electric current passing through the second electric machine element (e.g., coil) may be used to produce an opposing magnetic field which resists the rotating turbomachinery from unbalancing itself and contacting the housing. Advantageously, such balancing operation may eliminate the need for an abradable material that protects the rotating turbomachinery against rub.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
    a fan section, a compressor section, a combustor section, and a turbine section, wherein at least a portion of the fan section, the compressor section, and the turbine section are operably connected by a shaft; and
    an electric machine assembly comprising:
        a rotating component connected to the shaft and comprising a plurality of airfoils;
        a plurality of first electric machine elements, wherein each airfoil of the plurality of airfoils comprises a respective first electric machine element, wherein each first electric machine element comprises a magnetic material;
        a housing arranged radially outward from the plurality of airfoils, the housing comprising a circumferential slot;
        a second electric machine element arranged within the circumferential slot, wherein the second electric machine element comprises a coil configured as a circumferential winding arranged radially outward from the rotating component and within the circumferential slot, wherein the coil has a coil diameter (D) that is sized relative to a chord length (L) of the plurality of airfoils such that: $0.25\ L \leq D \leq 1.50\ L$; and
        a control system electrically connected to the second electric machine element and completely encapsulated within the circumferential slot, wherein the coil of the second electric machine element connects to a first side of the control system, extends continuously about the circumferential slot, and connects to a second side of the control system,
    wherein rotation of the rotating component causes the plurality of first electric machine elements to generate a dynamic magnetic flux to induce a current within the second electric machine element, and
    wherein the control system is configured to distribute the current induced within the second electric machine element to at least one of a storage device or electrical components of the gas turbine engine.

2. The gas turbine engine of claim 1, wherein each first electric machine element comprises a magnetic cap arranged at a tip of a respective airfoil.

3. The gas turbine engine of claim 1, wherein each first electric machine element comprises a magnetic coating applied to a tip of a respective airfoil.

4. The gas turbine engine of claim 1, wherein each airfoil of the plurality of airfoils comprises a magnetic material that extends from a root to a tip of the respective airfoil, wherein the plurality of first electric machine elements is defined by the magnetic material airfoils.

5. The gas turbine engine of claim 1, further comprising a cover arranged between tips of the respective airfoils and the second electric machine element, the cover sealing the second electric machine element and the control system within the slot.

6. The gas turbine engine of claim 1, further comprising a filler material arranged within the slot to secure the second electric element within the slot.

7. The gas turbine engine of claim 1, wherein the control system comprises at least one electronic control element and an electrical storage element.

8. The gas turbine engine of claim 1, wherein the control system is configured to direct a current through the second electric machine element in a reverse direction counter to a direction of rotation of the rotating component.

9. The gas turbine engine of claim 8, further comprising at least one sensor arranged to monitor an air gap between blade tips of the plurality of airfoils and the housing, wherein the control system is configured to control a current through the second electric machine element to correct for deviations in the air gap and balance or align the rotating component relative to the housing.

10. The gas turbine engine of claim 8, wherein the control system is configured to direct a counter current through the second electric machine element to induce a reverse magnetic field and slow a rotation of the rotating component.

11. The gas turbine engine of claim 8, wherein the control system is configured to maintain an alignment of the rotating component relative to the housing by selectively directing the current through the second electric machine component.

12. The gas turbine engine of claim 1, wherein the rotating component is part of at least one of the fan section, the compressor section, or the turbine section.

13. The gas turbine engine of claim 1, wherein the second electric machine element is formed of a coil made from at least one of copper, gold, aluminum, silver.

14. The gas turbine engine of claim 1, wherein the first electric machine element is formed from neodymium.

15. The gas turbine engine of claim 1, wherein the fan section, a low pressure compressor of the compressor section, and a low pressure turbine of the turbine section comprise a low-pressure system having a rotational speed of N1 and a high pressure compressor of the compressor section and a high pressure turbine of the turbine section comprise a high-pressure system having a rotational speed of N2, wherein the control system is configured to distribute the current to at least one of the low-pressure system and the high-pressure system to couple the rotational speeds N1, N2.

16. A method of operating a gas turbine engine, wherein the gas turbine engine comprises a fan section, a compressor section, a combustor section, and a turbine section, wherein at least a portion of the fan section, the compressor section, and the turbine section are operably connected by a shaft, the method comprising:
   rotating a plurality of first electric machine elements on a rotating component, wherein the plurality of first electric machine elements are arranged at tips of respective airfoils of the rotating component, wherein each first electric machine element comprises a magnetic material;
   inducing a current within a second electric machine element, the second electric machine element configured as a coil arranged within a circumferential slot in a housing that is arranged radially outward from the airfoils of the rotating component; wherein the coil is arranged as a circumferential winding arranged radially outward from the rotating component within the circumferential slot, and wherein the coil has a coil diameter (D) that is sized relative to a chord length (L) of the plurality of airfoils such that: $0.25\ L \leq D \leq 1.50\ L$; and
   distributing the current induced within the second electric machine element using a control system that is electrically connected to the second electric machine element, wherein the control system is completely encapsulated within the circumferential slot, and wherein the coil of the second electric machine element connects to a first side of the control system, extends continuously about the circumferential slot, and connects to a second side of the control system;
   wherein rotation of the rotating component causes the plurality of first electric machine elements to generate a dynamic magnetic flux to induce the current within the second electric machine element, and
   wherein the current is distributed to at least one of a storage device or electrical components of the gas turbine engine.

17. The method of claim 16, further comprising reversing a current through the second electric machine element to cause a balancing operation to maintain an air gap between tips of the plurality of airfoils and the housing.

18. The method of claim 16, further comprising reversing a current through the second electric machine element to generate a braking force to slow a rotation of the rotating component.

19. The method of claim 16, wherein the fan section, a low pressure compressor of the compressor section, and a low pressure turbine of the turbine section comprise a low-pressure system having a rotational speed of N1 and a high pressure compressor of the compressor section and a high pressure turbine of the turbine section comprise a high-pressure system having a rotational speed of N2, the method further comprising:
   distributing the current to at least one of the low-pressure system and the high-pressure system to couple the rotational speeds N1, N2.

* * * * *